United States Patent [19]

Naitou et al.

[11] 4,256,238
[45] Mar. 17, 1981

[54] ESCAPEMENT ASSEMBLY FOR FASTENING FEEDING APPARATUS

[75] Inventors: Takao Naitou, Katano; Toshio Tsuzuki, Hirakata, both of Japan

[73] Assignee: Matsushita Electric Industrial Co., Ltd., Kadoma, Japan

[21] Appl. No.: 60,031

[22] Filed: Jul. 23, 1979

[30] Foreign Application Priority Data

Jul. 27, 1978 [JP] Japan .................. 53-92243

[51] Int. Cl.³ .............................. B65G 59/06
[52] U.S. Cl. .................................. 221/263
[58] Field of Search ............... 221/290, 296, 167, 292, 221/293, 263, 270, 273, 274, 165, 175, 93

[56] References Cited

U.S. PATENT DOCUMENTS

| | | | |
|---|---|---|---|
| 145,818 | 12/1873 | Smith | 221/263 |
| 2,161,845 | 6/1939 | Barton | 221/263 X |
| 2,227,576 | 1/1941 | Elliott et al. | 221/263 X |

*Primary Examiner*—Stanley H. Tollberg
*Attorney, Agent, or Firm*—Wenderoth, Lind & Ponack

[57] ABSTRACT

An escapement assembly utilizable in a fastener feeding apparatus for successively separating the fasteners one by one and feeding the separated fastener to a desired handling location comprises an escape passage and a nail plate supported for reciprocal movement. This nail plate is formed with an aperture adapted to be aligned with the escape passage, an inclined elongated groove having one end communicated to a receiving finger adapted to be communicated to a guide track of a chute assembly, and a parallel groove extending in a direction parallel to the direction of movement of the nail plate and having one end communicated to the aperture and the other end communicated to the other end of the inclined elongated groove.

2 Claims, 7 Drawing Figures

ESCAPEMENT ASSEMBLY FOR FASTENING FEEDING APPARATUS

The present invention generally relates to a fastener feeding apparatus utilizable with a power operated tool such as a screw driver, riveting tool or the like and, more particularly, to an escapement assembly for successively separating individual fasteners from a row of the fasteners from the row and delivering the same towards the power operated tool.

Examples of prior art fastener feeding apparatus are disclosed, for example, in the U.S. Pat. Nos. 3,038,637, 3,247,874 and 3,779,422. All of the fastener feeding apparatuses disclosed in these prior art references include an escapement assembly mounted on one end of a guide chute or track assembly remote from the fastener supply hopper.

The escapement assembly disclosed in the first mentioned U.S. Pat. No. 3,038,637 comprises a slider for selectively interrupting and establishing communication between a guide track and a supply passage defined in a slider block positioned adjacent to the guide track, and a support plate formed integrally with a separating finger and supported in operatively associated relation with a pneumatically driven plunger for reciprocal movement in a direction perpendicular to the lengthwise direction of the guide track for causing the separating finger to separate individual fasteners in a row on the guide track from the row and for temporarily retaining the separated fastener at a position aligned with and above the supply passage in the slider block. Since the slider and the support plate are so designed as to be moved in a direction parallel to the guide track by the action of a cam plate movable in response to the movement of the plunger, not only is the construction complicated, but also no time lag is available between the movement of the slider and that of the separating finger and the support plate and, therefore, the stability of operation is insufficient.

An apparatus which appears to have substantially elminated the disadvantages inherent in the escapement assembly of the construction described above, that is, the complexity in construction and the increased number of component parts, is disclosed in the second mentioned U.S. Pat. No. 3,247,874. According to this patent, the escapement assembly comprises a shuttle plate for separating the fasteners one at a time and an inclined guide groove defined in the shuttle plate and having one end opening on an upper surface of the shuttle plate and the other end adapted to be placed in communication with a supply passage, a substantially intermediate portion of the inclined guide groove being inclined relative to the plane of the upper surface of the shuttle plate. In this escapement assembly, since only the movement of the shuttle plate is sufficient to achieve the separation of the fasteners from the row thereof one at a time and the feeding of the separated fastener onto the supply passage, the construction appears to be simple. However, since the inclined guide groove is adapted to communicate directly with the supply passage, there is the possibility that two or more of the fasteners can be jammed above the supply passage and, therefore, the reliability of operation appears to be insufficient.

Accordingly, the present invention has been made with a view to substantially eliminating the above described disadvantages and inconveniences inherent in the prior art escapement assemblies and is intended to provide an improved escapement assembly which has a simple construction and which is reliable in operation.

This and other objects and features of the present invention will become apparent from the following description of a preferred embodiment thereof with reference to the accompanying drawing, in which.

Before the description of the present invention proceeds, it is to be noted that like parts are designated by like reference numerals throughout the accompanying drawings.

Figure 1:
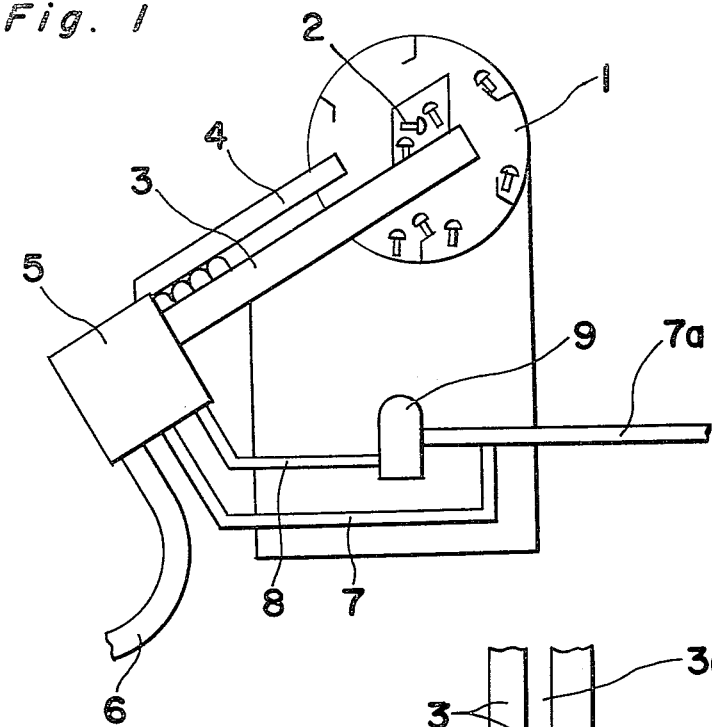
FIG. 1 is a schematic side view of a fastener feeding apparatus.

Referring first to FIG. 1, there is schematically illustrated a fastener feeding apparatus which comprises a feeder drum 1 for scooping up fasteners, for example, screws 2, from a container (not shown) and for transporting the scooped up screws to a position above the container and also above one end of a guide chute assembly 3. The guide chute assembly 3 is comprised of a pair of juxtaposed guide rails spaced apart from each other to define a guide track 3a (FIG. 2) and a retainer bar 4 supported in position to overline the guide track 3a for avoiding any possible escape of some of the screws 2 on the guide chute assembly 3 from the latter. This guide chute assembly 3 extends downwardly so that the screws 2, which have been transported by the feeder drum 1 and subsequently fallen onto the one end of the guide chute assembly 3 under the influence of a gravitational force, can slide in a row downwardly along the guide track 3a towards an escapement assembly 5.

The escapement assembly 5 has a transport tubing 6 through which the screws 2 successively separated and fed one at a time from the guide chute assembly 3 by the escapement assembly can be transported towards a predetermined handling station, for example, a power operated screw driver (not shown), by the action of compressed air. The escapement assembly 5 is coupled with air tubes 8 and 7, the air tube 7 being in turn coupled to a source of compressed air (not shown) by way of a supply tube 7a while the air tube 8 is coupled to the supply tube 7a through a switching valve 9.

The structural details of the fastener feeding apparatus, except for the escapement assembly to which the present invention is directed, are substantially disclosed in any one of the aforementioned prior art references, particularly, the third mentioned U.S. Pat. No. 3,779,442, and a further description thereof is accordingly omitted for the sake of brevity. However, for better understanding of the position of the escapement assembly 5 relative to the remaining components of the fastener feeding apparatus, the operation of the fastener feeding apparatus of the construction so far described will now be described.

Assuming that the screws 2 are guided downwardly in a row along the guide track 3a, the opening of the switching valve 9 causes the escapement assembly 5 to assume one of the two different operative positions whereby the frontmost one of the screws of the row on the guide track 3a is introduced to the escapement assembly 5 and retained temporarily while a blast of compressed air is applied into the transport tubing 6. The subsequent closing of the switching valve 9 causes the escapement assembly 5 to assume the other of the operative positions whereby the foremost screw retained temporarily in the escapement assembly 5 is dropped into the transport tubing 6, thereby completing one cycle of operation of the escapement assembly. When the switching valve 9 is again opened during the next succeeding cycle of operation, not only is the next succeeding screw in the row on the guide track 3a introduced to the escapement assembly 5, but also the screw which has been dropped into the transport tubing 6 during the preceding cycle of operation is fed towards the screw driver by the action of a blast of compressed air supplied into the transport tubing 6.

The details of the escapement assembly 5 according to the present invention will now be described with particular reference to FIGS. 2 to 7.

Figure 3:
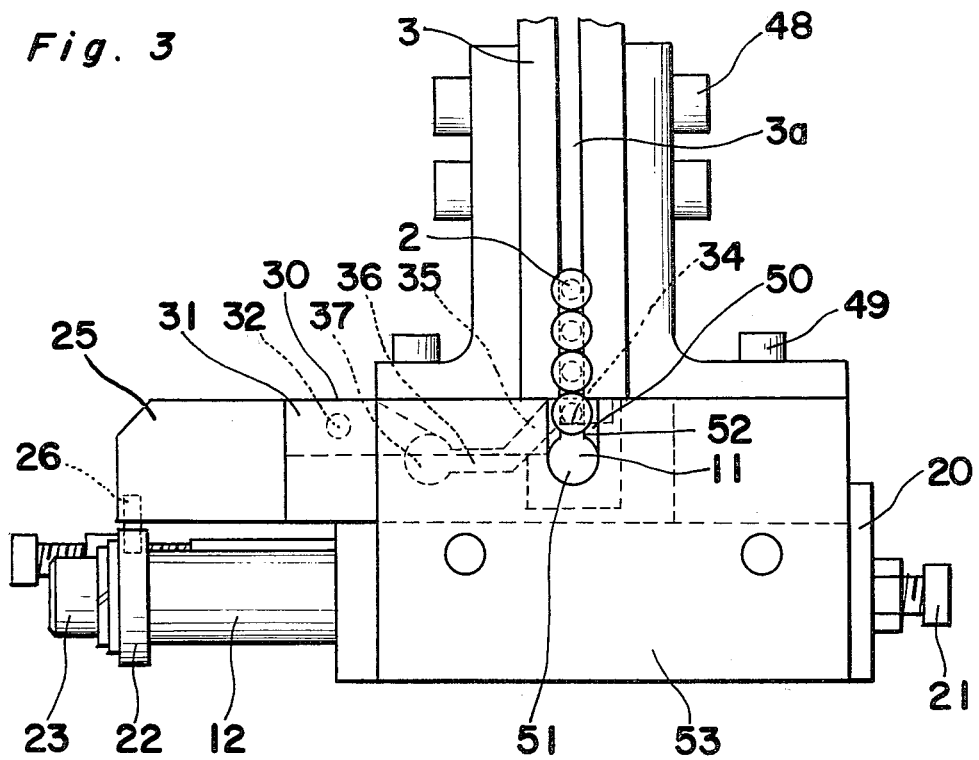
FIG. 3 is a top plan view of the escapement assembly in one operative position.
Figure 4:
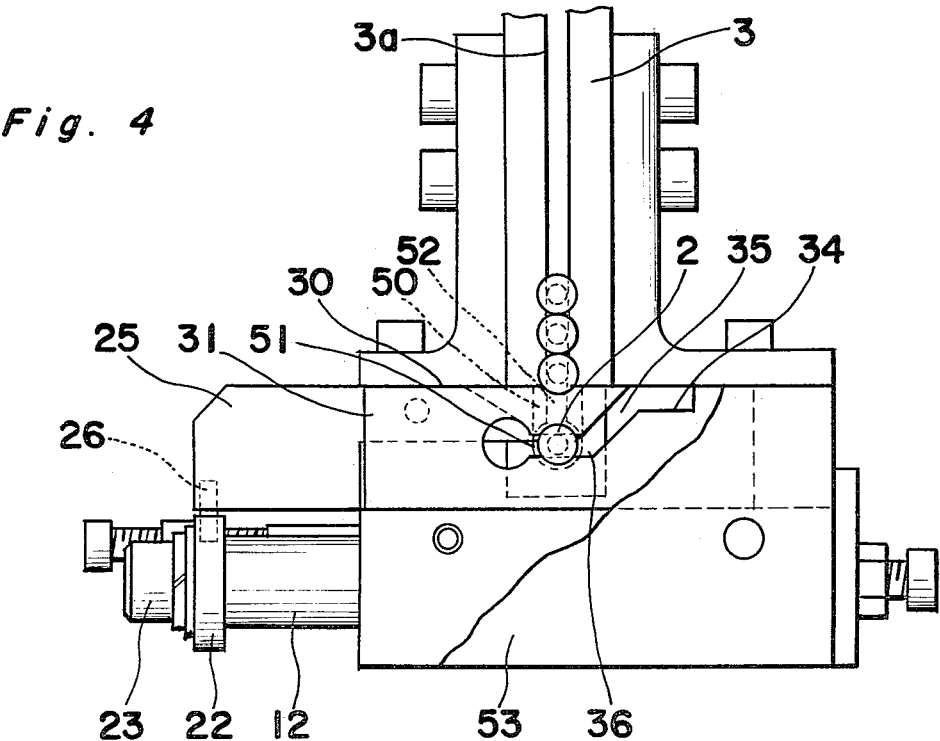
FIG. 4 is a view similar to FIG. 3, showing the escapement assembly in another operative position, with the respective portions of the top cover and the spacer plate broken away.
Figure 5:
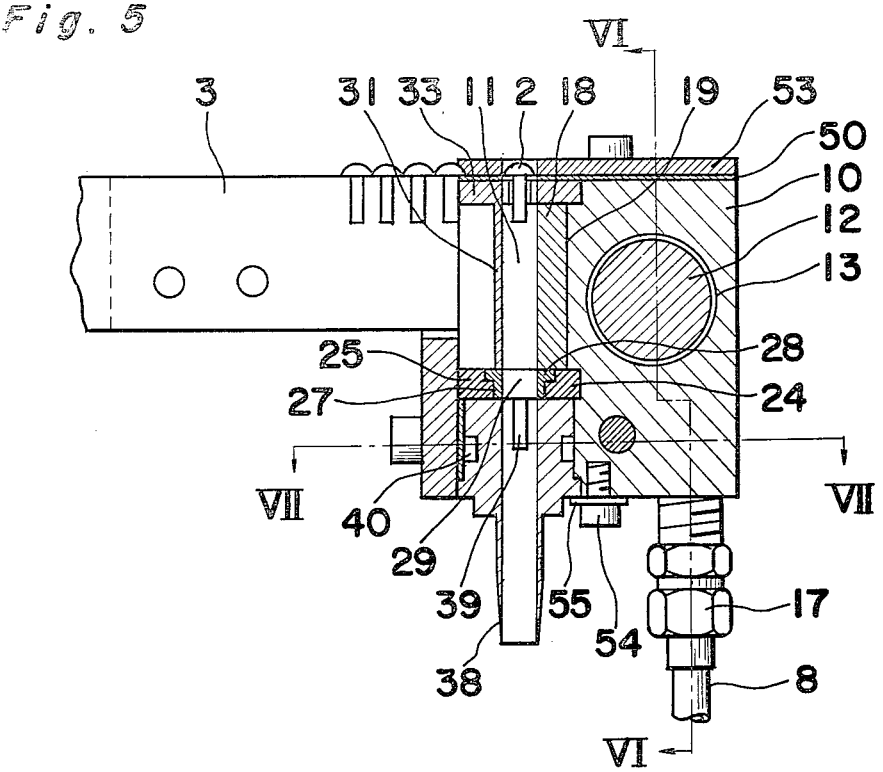
FIG. 5 is a cross sectional view taken along the line V—V in FIG. 2.
Figure 6:
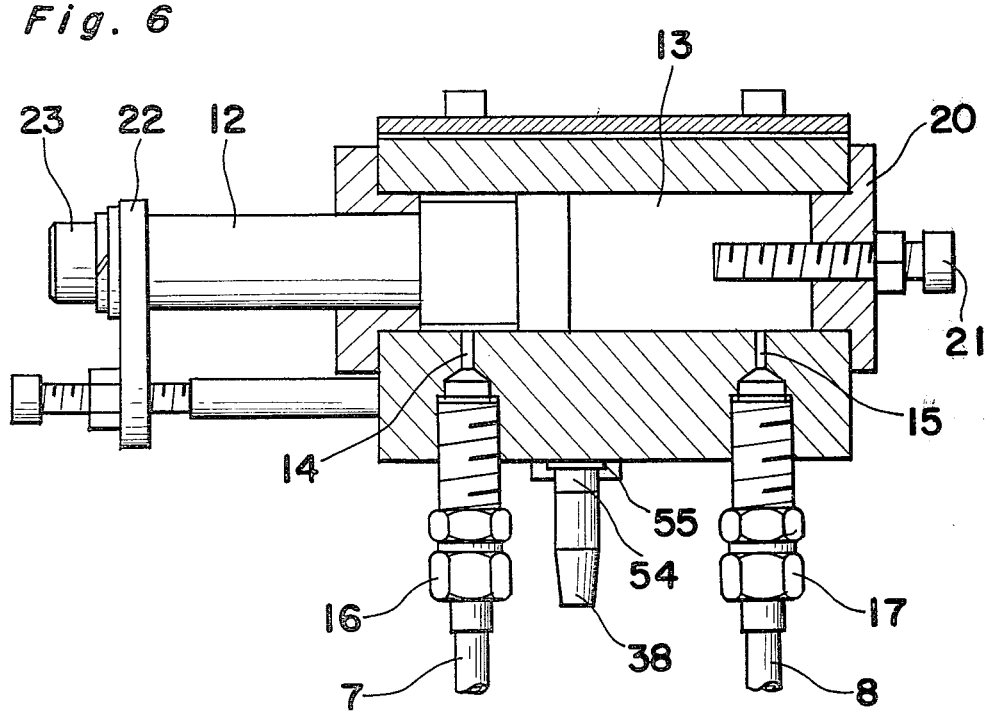
FIG. 6 is a cross sectional view taken along the line VI—VI in FIG. 5.

Referring to FIGS. 2 to 7, the escapement assembly 5 according to the present invention comprises a generally rectangular block 10 having a working chamber 13 of circular cross section defined therein as best shown in FIG. 5, said workig chamber 13 being for accommodating a pneumatically driven plunger 12 and having its longitudinal axis extending in a direction at right angles to the longitudinal axis of an escape passage 11. The block 10 also has a pair of spaced air passages 14 and 15 therein as best shown in FIG. 6, said air passages 14 and 15 being connected to the working chamber 13 on one hand and receiving respective couplers 16 and 17 on the other hand, said couplers 16 and 17 being in turn connected to the respective air tubes 7 and 8 shown in FIG. 1.

The escape passage 11 is defined in a generally rectangular-sectioned block 18 which is received in a support recess 19 having a cross sectional shape complementary to that of the block 18 and defined in the generally rectangular block 10.

As best shown in FIG. 6, the plunger 12 axially slidably accommodated within the working chamber 13 has opposed to its right-hand end a stroke adjustment screw 21 adjustably extending through a cylinder head 20 fast with the block 10 and at its left-hand end a connecting plate 22 rigidly connected thereto by means of a fastening bolt 23. The connecting plate 22 has a lateral side face which is rigidly connected a shutter plate 25 by means of a connecting pin 26 as best shown in FIGS. 2 to 5, said shutter plate 25 being slidably received in a guide groove 24 defined in the block 10 for movement between receiving and releasing positions as will be described later.

The shutter plate 25 has an opening 27 defined therein at a position which, when the plunger 12 is moved to the right as viewed in FIGS. 2 to 4 and 6 with the shutter plate 25 held in the releasing position, is aligned with the escape passage 11, said opening 27 having therein a guide bushing 28 having an inner diameter equal to the diameter of the escape passage 11 and slightly greater than the maximum diameter of the head portion of each screw 2 with which the escapement assembly 5 embodying the present invention is operable.

One lateral side face of the block 10 facing the guide chute assembly 3 has a guide groove 30 therein in which a nail member 31 is slidably received. This nail member 31 serves to selectively interrupt and establish a passage for the screws between the guide track 3a and the escape passage 11 and has a lower end rigidly connected to the shutter plate 25 by means of one or more connecting pins 32. This nail member 31 has at the upper end an integral separating finger 33, a receiving finger 34, an inclined groove 35, a parallel groove 36 extending parallel to the direction of movement of the shutter plate 25, and an aperture 37 connected to the parallel groove 36 at a position remote from the inclined groove 35.

Figure 7:
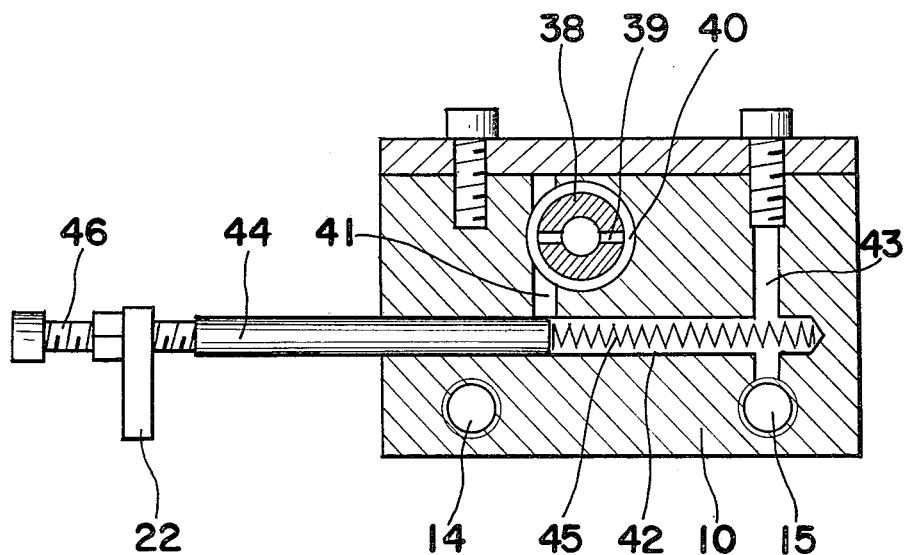
FIG. 7 is a cross sectional view taken along the line VII—VII in FIG. 5.

As best shown in FIGS. 5 and 6, the escape passage 11 has a lower end receiving a coupling 38 and being, through this coupling 38, connected to the transport tubing 6 (FIG. 1) which may extend to the power operated screw driver The coupling 38 is held in position by a washer-like retainer plate 55 secured to the block 10 by means of a set bolt 54 and has a circumferentially extending annular groove 40 defined in the outer peripheral surface thereof as best shown in FIG. 5. In addition, one end portion of the coupling 38 opposite to the transport tubing 6 and adjacent the bushing 28 has a pair of opposed axially extending slits 39 as best shown in FIGS. 5 and 7. As best shown in FIG. 7, the interior hollow of the coupling 38 is adapted to be connected to the air passage 15 through the slits 39 by way of air passages 41, 42 and 43 all defined in the block 10.

The air passage 42 has a rod 44 axially slidably housed therein, said rod 44 having one end held in contact with a biasing spring, for example, a compression spring 45, housed within the air passage 42 while the other end of said rod 44 is biased into contact the position adjustment screw member 46 threadingly carried by the connecting plate 22. The rod 44 is so designed that, when the plunger 12 is moved to the left as viewed in FIG. 6, the rod 44 is held in position to establish a fluid communication between the interior of the coupling 38 and the air passage 15.

Reference numeral 53 represents a top cover rigidly mounted on the block 10 with a thin spacer plate 50 sandwiched between the block 10 and the top cover 53. As best shown in FIG. 3, the thin spacer plate 50 has an escape hole 51 with a diameter equal to the diameter of the escape passage 11, which hole 51 is, when the spacer plate 53 is held in position on the block 10 with the top cover 53 overlaying said spacer plate 50, aligned with the escape passage 11. This spacer plate 50 also has a groove 52 with a width equal to the width of the guide track 3a, said groove 52 extending from one side edge of the spacer plate 50 adjacent the guide chute assembly 3 and terminating in communication with the escape hole 51 as best shown in FIG. 3. The thickness of the spacer plate 50 is so selected that the upper surface thereof can be held flush with the top plane of the guide track 3a.

The escapement assembly 5 of the construction described above is either rigidly or removably connected to the guide chute assembly 3 by means of a pair of spaced connectors 47 rigidly connected to the respective guide rails by means of set bolts 48 on one hand and rigidly connected to the block 10 by means of set bolts 49 on the other hand.

The operation of the escapement assembly 5 having the construction described above will now be described.

When the valve 9 is opened, compressed air is fed into the working chamber 13 through the air passage 15 and acts on the right-hand end face of the plunger 12 as viewed in FIG. 6. Since the pressure of the compressed air so applied t the right-hand end face of the plunger 12 is higher than the pressure which has been applied to the left-hand end face of the plunger 12 through the air passage 14, the plunger 12 moves to the left. This condition is illustrated in FIGS. 3 and 6. Incident to the movement of the plunger 12 in a direction towards the left, the shutter plate 25 is also moved from the releasing position towards the receiving position together with the nail member 31.

As the nail member 31 is moved together with the shutter plate 25 moving from the releasing position towards the separating position, the front one of the screws 2 of the row which has been retained in position by the separating finger 33 is introduced into the groove 52 in the spacer plate 50 and then engaged with the receiving finger 34. During this engagement of the screw 2 with the receiving finger 34, the screw 2 assumes a steady position in readiness for the subsequent movement towards the escape passage 11.

On the other hand, when the plunger 12 is completely moved to the left, the air passage 15 is connected to the interior of the coupling 38 through the slits 39 by way of the annular groove 40 via the air passages 43, 42 and 41, whereby the compressed air is supplied into the transport tubing 6.

When the switching valve 9 is subsequently closed, the compressed air is supplied only to the air passage 14 and, therefore, the plunger 12 is moved from the left towards the right, accompanied by the corresponding movement of the shutter plate 25 from the separating position towards the releasing position together with the nail member 31. By this movement of the nail member 31, the screw which has been engaged to the receiving finger 34 is introduced into the inclined groove 35 on one hand and the next succeeding screw in the row of the screws is retained in position by the separating finger 33.

As shown in FIG. 4, during the continued movement of the nail member 31 while the shutter plate 25 is moved from the separating position towards the releasing position, the screw 2 held in the inclined groove 35 is relatively moved towards the parallel groove 36 and is then temporarily held in position within the parallel groove 36. Where the head portion of each of the screws 2 is larger in size than the stem portion thereof, there is the possibility that the screw will tilt during the relative movement thereof along the inclined groove 35. However, once the screw enters the parallel groove 36, the screw assumes a steady position without being tilted. On the other hand, if the stem portion of each of the screws is longer than the head portion thereof, there is the possibility that the screw will tilt during the relative movement thereof along the inclined groove 35 due to the unbalance between the head and stem portions thereof. However, once the screw enters the parallel groove 36, the screw assumes a steady position without being tilted.

Figure 2:
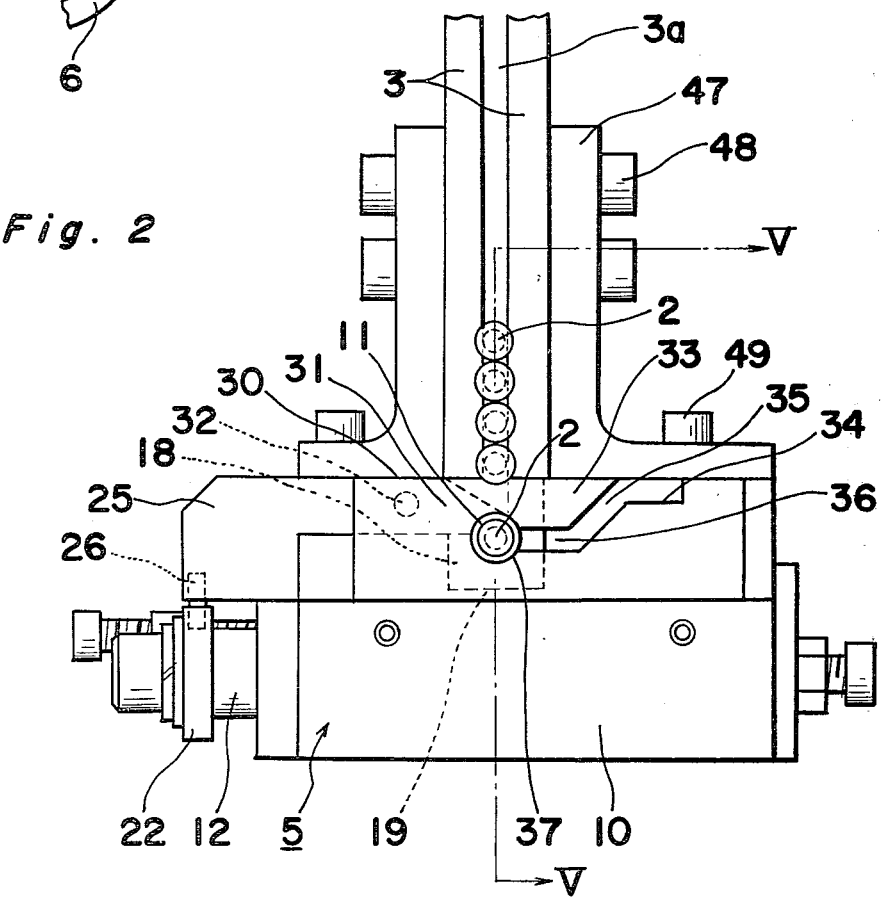
FIG. 2 is a top plan view, on an enlarged scale, of an escapement assembly according to the present invention with a top cover and a spacer plate removed.

When the plunger 12 is completely moved to the right, as shown in FIG. 2, the screw 2 is released to drop into the escape passage 11 through the escape hole 52 in the spacer plate 50 with the aperture 37 in the nail member 31 being aligned with the escape passage 11. At this time, since the opening 27 in the shutter plate 25 is aligned with the escape passage 11, the screw dropping into the escape passage 11 falls by gravity into the transport tubing 6 through the coupling 38.

When the valve 9 is again opened at the time of start of the next succeeding cycle of operation, the plunger 12 is moved towards the left in the manner described above and the compressed air is supplied into the coupling 38 and then into the transport tubing 6 and, therefore, the screw within the transport tubing 6 is positively transported by the action of the compressed air so supplied towards the screw driver.

In the escapement assembly of the construction as hereinbefore fully described, during the reciprocal movement of the plunger 12, the screws arranged in a row can be separated from the row one at a time by the separating finger, receiving finger and inclined groove, which are defined in the nail member, and the separated screw can then be transported to a position above the escape passage while being retained temporarily in position within the parallel groove, and subsequently released to fall into the escape passage.

Accordingly, by so designing the escapement assembly, the latter can be manufactured in a compact size. In addition, since the separating and receiving fingers both defined in the nail member participate in separation of each one of the screws and also in transportation of the separated screw to the position above and in alignment with the escape passage, the time required for the separated screw to move can be reduced and, as a whole, the fastener feeding can readily and speedily be performed.

In any event, the present invention has the feature that the separated screw relatively moving along the inclined groove is transported towards the parallel groove without falling into the escape passage and will fall into the escape passage through the aperture in the nail member after the position or posture of the separated screw has been self-corrected during the relative movement thereof along and through the parallel groove. The mere employment of the parallel groove according to the present invention is advantageous in that the separated screw assumes a steady position or posture before it is dropped into the escape passage, thereby avoiding the possibility of the transportation of the screw in an upside down position and/or the jamming of the screws which would lead to malfunction of the fastener feeding apparatus. In view of the foregoing, it is clear that the present invention is effective to provide an improved escapement assembly which is reliable in operation substantially eliminating the disadvantages and inconveniences inherent in the prior art escapement assemblies.

Although the present invention has fully been described in connection with the preferred embodiment thereof with reference to the accompanying drawings, it is to be noted that various changes and modifications will be apparent to those skilled in the art. Such changes and modifications are to be understood as being included within the true scope of the present invention unless they depart therefrom.

What is claimed:

1. An escapement assembly for successively receiving individual fasteners which have been transported thereto in a row by means of a chute assembly and for feeding the fasteners to a desired handling station one at a time through a transport tubing, which comprises:

an escape passage having first and second ends opposite to each other, the second end of the escape passage means being adapted to have the transport tubing connected thereto; and a nail plate means positioned adjacent the chute assembly and above the first end of the escape passage means, said nail plate means being supported for reciprocal movement in a direction at right angles to the longitudinal axis of the chute assembly for separating individual fasteners from the row and for subsequently transporting the separated fastener towards the first end of the escape passage means, said nail plate means including a separating finger for moving across the path of movement of the fasteners from the chute assembly to the escape passage means during each reciprocal movement of the nail plate means for separating individual fasteners from the row, said nail plate means having an aperture defined therein having a size sufficient to allow a head portion of each of the fasteners to pass therethrough, said aperture being aligned with the escape passage when the nail plate means is moved to the end of its path of movement in one direction, said nail plate means further having an elongated groove having one end adjacent said separating finger for receiving the separated fastener, a substantially intermediate groove portion extending from said one end and inclined relative to the longitudinal axis of the chute assembly, and a parallel groove portion extending parallel to the direction of movement of the nail plate means and having one end connected to the other end of the inclined groove portion and the other end connected to the aperture, whereby said parallel groove portion serves to temporarily hold the separated fastener which has been transported thereto through the inclined groove portion during the movement of the nail plate means for making sure it is in the proper position to fall into said escape passage means.

2. An escapement assembly as claimed in claim 1, wherein said one end of the elongated groove has a receiving finger extending parallel to the direction of movement of the nail plate means and in a direction opposite to the direction in which the parallel groove portion extends away from the inclined groove portion, said receiving finger serving to temporarily hold the separated fastener.

* * * * *